Sept. 15, 1953 R. L. WALLACE, JR 2,652,460

TRANSISTOR AMPLIFIER CIRCUITS

Filed Sept. 12, 1950 5 Sheets-Sheet 1

INVENTOR
R. L. WALLACE JR.
BY Harry C. Hart
ATTORNEY

Sept. 15, 1953 R. L. WALLACE, JR 2,652,460

TRANSISTOR AMPLIFIER CIRCUITS

Filed Sept. 12, 1950 5 Sheets-Sheet 2

FIG. 2a

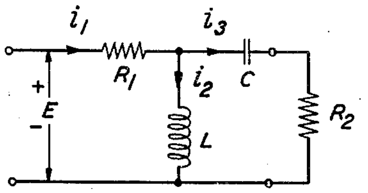

$$R_1 i_1 + jL\omega i_2 = E$$

$$-jL\omega i_2 + \frac{1}{jC\omega} i_3 + R_2 i_3 = 0$$

$$i_1 - i_2 - i_3 = 0$$

WHICH CAN BE WRITTEN $$e_{R_1} + e_L = E$$

$$-e_L + e_C + e_{R_2} = 0$$

$$i_1 - i_2 - i_3 = 0$$

FIG. 2b

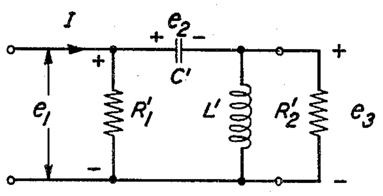

$$\frac{e_1}{\left(\frac{r^2}{R_1}\right)} + \frac{e_2}{\frac{r^2}{jL\omega}} = I$$

$$-\frac{e_2}{\left(\frac{r^2}{jL\omega}\right)} + \frac{e_3}{jr^2C\omega} + \frac{e_3}{\left(\frac{r^2}{R_2}\right)} = 0$$

$$e_1 - e_2 - e_3 = 0$$

WHICH CAN BE WRITTEN $$i_{R_1'} + i_{C'} = I$$

$$-i_{C'} + i_{L'} + i_{R_2'} = 0$$

$$e_1 - e_2 - e_3 = 0$$

WHEN $$R_1' = \frac{r^2}{R_1}$$

$$C' = L/r^2$$

$$L' = r^2 C$$

$$R_2' = r^2/R_2$$

INVENTOR
R. L. WALLACE JR.
BY Harry C. Hart
ATTORNEY $$e_1 = e_{C_1} + e_{R_1} - E_g$$
$$e_g = e_{R_1} - E_g$$
$$E_B - e_{R_2} = e_p$$
$$e_2 = e_p$$

$$i_1 = i_{L_1'} + i_{R_1'} - I_e$$
$$-i_e = i_{R_1'} - I_e$$
$$I_c - i_{R_2'} = -i_c$$
$$i_2 = -i_c$$
$$R_1' = r^2/R_1$$
$$R_2' = r^2/R_2$$
$$L_1' = r^2 C_1$$

INVENTOR
R. L. WALLACE JR.
BY Harry C. Hart
ATTORNEY

TRANSISTOR AMPLIFIER CIRCUITS

Filed Sept. 12, 1950 5 Sheets-Sheet 4

FIG. 7b

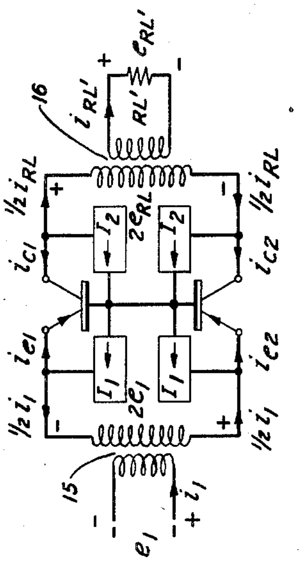

$$I_1 - i_{e1} - \tfrac{1}{2} i_1 = 0$$
$$I_1 - i_{e2} + \tfrac{1}{2} i_1 = 0$$
$$i_1 = i_{e2} - i_{e1}$$
$$2I_1 = i_{e2} + i_{e1}$$
$$e_{e1} - e_1 = -e_{e2} + e_1$$
$$2e_1 = e_{e2} - e_{e1}$$
$$I_2 + \tfrac{1}{2} i_{RL} + i_{c1} = 0$$
$$I_2 - \tfrac{1}{2} i_{RL} + i_{c2} = 0$$
$$2I_2 = -i_{c1} - i_{c2}$$
$$i_{RL} = i_{c2} - i_{c1}$$
$$-e_{c1} + e_{RL} = -e_{c2} - e_{RL}$$
$$2e_{RL} = e_{c1} - e_{c2}$$

FIG. 7a

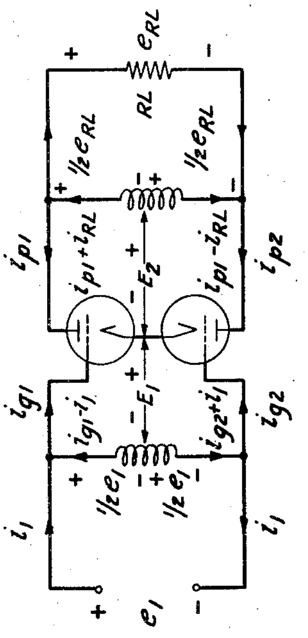

$$E_1 + e_{g1} - \tfrac{1}{2} e_1 = 0$$
$$E_1 + e_{g2} + \tfrac{1}{2} e_1 = 0$$
$$e_1 = e_{g1} - e_{g2}$$
$$2E_1 = -e_{g1} - e_{g2}$$
$$i_{g1} - i_1 = i_{g2} + i_1$$
$$2i_1 = i_{g1} - i_{g2}$$
$$E_2 + \tfrac{1}{2} e_{RL} - e_{p1} = 0$$
$$E_2 - \tfrac{1}{2} e_{RL} - e_{p2} = 0$$
$$2E_2 = e_{p1} + e_{p2}$$
$$e_{RL} = e_{p1} - e_{p2}$$
$$i_{p1} + i_{RL} = i_{p2} - i_{RL}$$
$$2i_{RL} = i_{p2} - i_{p1}$$

INVENTOR
R. L. WALLACE JR.
BY Harry C. Hart
ATTORNEY

INVENTOR
R. L. WALLACE JR.
BY Harry C. Hart
ATTORNEY

Patented Sept. 15, 1953 2,652,460

UNITED STATES PATENT OFFICE 2,652,460

TRANSISTOR AMPLIFIER CIRCUITS

Robert L. Wallace, Jr., Plainfield, N. J., assignor to Bell Telephone Laboratories, Incorporated, New York, N. Y., a corporation of New York Application September 12, 1950, Serial No. 184,457

10 Claims. (Cl. 179—171)

This invention relates to transistor translating circuits.

The general objects of the invention are to provide novel transistor circuits and particularly transistor amplifier circuits of improved performance. Those transistor circuits so provided which are chosen for illustration exemplify the central principle of the invention and the design principles according to which not only these illustrative circuits, but many others, too, are derived and may be constructed.

Another particular object is to provide an improved multistage transistor amplifier.

A related object is to provide an improved interstage coupling network for a multistage transistor amplifier.

Another related object is to provide automatic adjustment of the emitter bias current of a transistor amplifier.

Another particular object of the invention is to provide an efficient class B push-pull transistor translating circuit.

The transistor, which is the subject of a patent application of John Bardeen and W. H. Brattain, Serial No. 33,466, filed June 17, 1948, now Patent 2,524,035, issued October 3, 1950, is a three-electrode device capable of amplifying electric signals. Upon the announcement of the invention of the transistor, it was generally treated as analogous to a vacuum tube and efforts were made to amplify and otherwise translate electric signals by means of conventional circuits whose performance in connection with vacuum tubes had become well known, the only change made being to substitute a transistor for the vacuum tube. These efforts were often of doubtful success, and the reason was believed to be that the transistor was at best a very imperfect analog of the vacuum tube.

Among the various points of departure of the transistor from perfect analogy with the vacuum tube, those principally remarked upon have been its low input impedance and the fact that it is essentially a current-operated device, as compared with the high input impedance and voltage operation of the vacuum tube triode. It was believed that such points of dissimilarity constituted defects, perhaps temporary only, in the transistor, and it was hoped that improvements in fabrication procedures would result in transistors which should be more nearly perfect analogs of the vacuum tube, in which case improved performance in conventional circuits might be expected. At the same time a number of novel circuits were constructed which appeared to take advantage of the peculiar characteristics of the transistor, but the search for such new circuits was necessarily conducted in a somewhat haphazard fashion.

The present invention is based upon the realization that the transistor approximates the dual counterpart of a vacuum tube triode much more closely than it approximates the analog of the tube, and that, in fact, it approximates the tube dual very closely indeed; and that this duality relation holds not only in a qualitative sense but in a quantitative sense as well, as may be immediately seen by comparison of the transistor collector voltage-current characteristics for various values of emitter current with the tube anode current-voltage characteristics for various values of the grid voltage. Thus, generally speaking, the more imperfect the parallel on the analogy basis, the more reliable and complete is the parallel on the duality basis.

The invention is further based upon the realization that when excellent performance is known to be obtainable from a particular circuit configuration of which a vacuum tube is a part, then comparable performance can be expected from a transistor circuit which is the dual of the known vacuum tube circuit, and of which the transistor, itself an approximate dual of the vacuum tube, forms a part.

As an example of the application of the foregoing principles and, incidentally, one in connection with which they were formulated, consider a class B push-pull transistor amplifier circuit. In the well-known class B push-pull vacuum tube amplifier circuit, each of the two tubes is biased substantially to its anode current cut-off, so that, in the absence of a signal, it dissipates only a negligible amount of power despite the fact that the quiescent anode voltage is high; and, when the signal is impressed on the input circuit, the two anode currents flow in alternation, wide swings of current and voltage being possible without overloading. When it was attempted to construct a push-pull transistor amplifier and to bias it for class B operation in this way, it was found to be very inferior; so much so that, instead of delivering several times the output power obtainable with an unbalanced amplifier circuit employing a single transistor, as was to be expected by analogy, it invariably delivered much less.

When, however, the transistor circuit was redesigned as the dual of the conventional vacuum tube circuit, the emitter current being treated as the bias control and the emitter current and plate current of each transistor being adjusted toward collector voltage cut-off, it was found to give excellent performance; indeed, it delivered twenty to forty times as much power as did the analog class B transistor amplifier. This serves to confirm the soundness of the general principles outlined above and formulated in detail below. These principles facilitate the design of large numbers of transistor circuits which are dual to known vacuum tube circuits and, to some extent, prediction of their performance.

In another aspect the invention provides an improved multistage transistor amplifier and frequency-selective interstage coupling networks for it which are the dual counterparts of the coupling networks commonly employed with conventional vacuum tube amplifiers, having low impedances within the pass band and higher impedances outside of it, where the common ones have high impedances in the band and higher impedances outside of it. In the simplest case the network is a series-resonant circuit as compared with the common parallel-resonant or antiresonant circuit of the vacuum tube amplifier.

In still another aspect the invention provides a combination of an inductive element and a resistor connected to the emitter of a transistor in such a fashion as to automatically adjust the emitter bias current to a value suitable for the input signal. This action is the dual counterpart of that of the grid-leak-condenser combination which is commonly employed for automatic control of the grid voltage bias of a vacuum tube.

The invention will be fully apprehended from the following detailed description of the principles upon which it is based and of certain specific embodiments thereof taken in connection with the appended drawings, in which:

Figs. 1*a* and 1*b* shown a family of conventional vacuum tube voltage-current characteristics and a family of transistor current-voltage characteristics, placed side by side for comparison;

Figs. 2*a* and 2*b* are circuit diagrams showing two passive networks each of which is the dual of the other, together with their defining equations;

Fig. 3*a* is a schematic circuit diagram showing a conventional vacuum tube amplifier while Fig. 3*b* shows its dual counterpart, a transistor amplifier, the defining equations of each being set forth side by side for comparison;

Fig. 3*c* is a diagram illustrating the equivalence of Thevenin's theorem;

Figure 8:
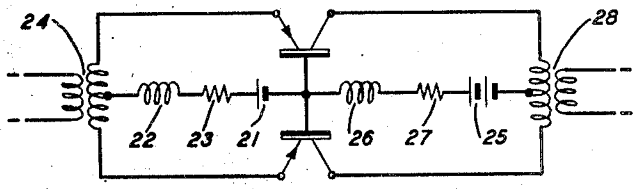
Figure 9:
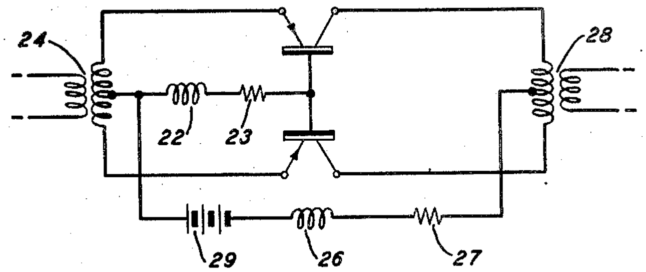
Figure 10:
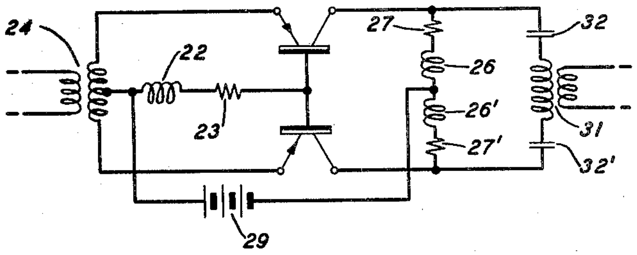
Figure 11:
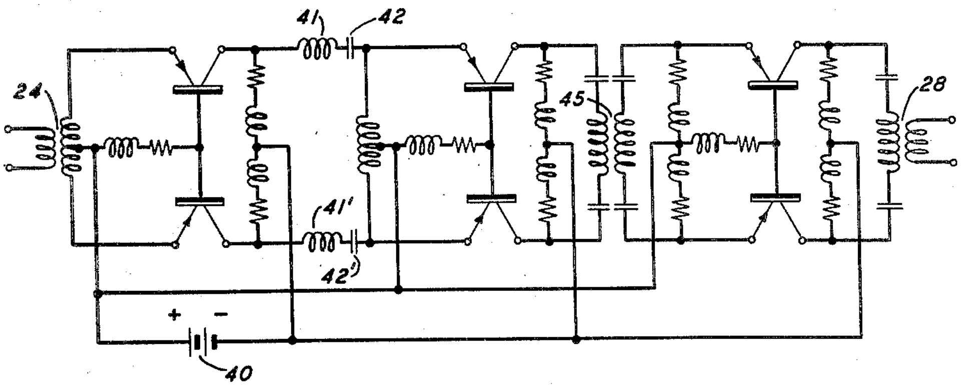

Figs. 7*a* and 7*b* are schematic circuit diagrams of a vacuum tube push-pull amplifier and of its dual counterpart, a transistor push-pull amplifier, the defining equations of each being placed side by side for comparison;

Fig. 8 is a schematic circuit diagram of a practical class B push-pull transistor amplifier, working into a resistive load;

Fig. 9 is a schematic circuit diagram showing a modification of Fig. 8 in which all bias currents are supplied from a common source;

Fig. 10 is a schematic circuit diagram showing a class B push-pull transistor amplifier working into a series resonant tuned circuit load; and Fig. 11 is a schematic circuit diagram showing an amplifier of three cascaded stages, each of which is a tuned class B transistor amplifier, together with series-resonant interstage coupling networks.

The principle of duality, which for general purposes is well explained by E. A. Guillemin in "Communication Network" (Wiley 1935), vol. 2, pages 246 and following, arises from a recognition that the following pairs of equations are mutually reciprocal in nature:

$$e=Ri \qquad i=Ge$$

and $$e=L\frac{di}{dt} \qquad i=C\frac{de}{dt}$$

where all of the symbols have their conventional meanings. Any quantity which in this sense is the reciprocal of another quantity is said to be the dual of that quantity. These equations, taken in pairs, are duals, and they show that complete duality exists between voltage, current, and the electric circuit elements.

We have

| Quantity | Dual Quantity |
|---|---|
| Voltage | Current. |
| Resistance | Conductance. |
| Inductance | Capacitance. |

Figure 1B:
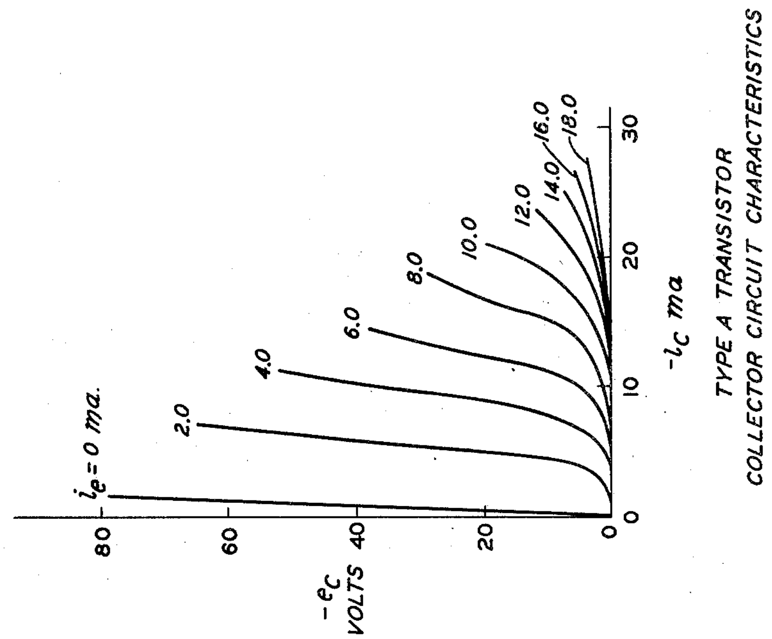
Figure 1A:
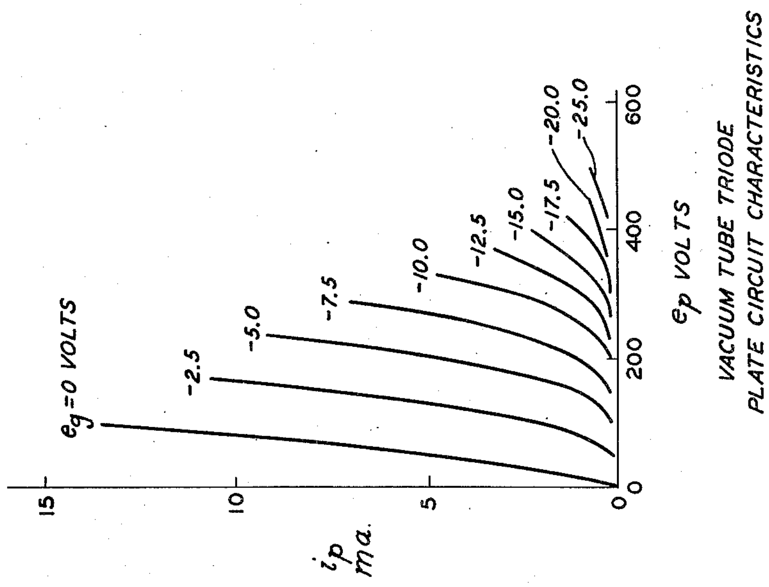

The vacuum tube is essentially a voltage-amplifying device while the transistor is essentially a current-amplifying device. This fact, which has been recognized for some time, hints that the relation between vacuum tubes and transistors is not one of similarity but rather of duality; that is, that the roles of currents and potentials in the transistor are just interchanged by comparison with their roles in the vacuum tube. Figs. 1*a* and 1*b* illustrate and confirm this statement. They show a family of static characteristics of a vacuum tube, as widely published in texts and handbooks, plotted beside a corresponding family of N-type transistor characteristics, as published, for example, by R. M. Ryder and R. J. Kircher in "Some Circuit Aspects of the Transistor," Bell System Technical Journal, July 1949, page 367 (vol. 28). When the axes are chosen in the manner shown, the two families of curves are almost identical in shape. The quantities which behave similarly are $e_p$ and $-i_c$
$i_p$ and $-e_c$
$-e_g$ and $i_e$, and, approximately,
$-i_g$ and $e_e$ The consistent difference in sign is of no significance with respect to duality considerations because it could be removed by a reversal of all the sign conventions for the transistor; and in fact the signs are all reversed for a P-type transistor. Comparison of the two families of characteristics of Figs. 1*a* and 1*b* indicates that the transistor collector circuit is an approximate dual of the vacuum tube plate circuit and that the emitter circuit is an approximate dual of the vacuum tube grid circuit. In particular, they show that the base, the emitter and the collector electrodes of the transistor correspond, dualitywise, to the cathode, the grid, and the anode of the tube.

Now that this dual relationship has been found, a problem arises as to what it means with respect to the design and performance of transistor translating circuits. Since the transistor is not so much the analog of the vacuum tube as its dual, it may be supposed that transistor circuits should not be similar to vacuum tube circuits but rather dual to them. This implies that if it is desired to duplicate, with a transistor, the performance of a known vacuum tube circuit, what is called for is not merely to remove the vacuum tubes and replace them with transistors but rather to first alter the circuit in such a way that the roles of currents and potentials are interchanged in all the passive elements of the circuit as well as in the active ones.

After such circuits have been found, the operating biases should be chosen in such a way as to take into account the following dual situations, stated with respect to N-type transistors: (With P-type transistors, the signs of all biases are to be reversed.)

I. Biasing the vacuum tube grid positively with respect to its cathode so that grid current begins to flow corresponds to biasing the transistor emitter negatively with respect to its base so that negative emitter potential begins to increase.

II. Biasing the vacuum tube grid sufficiently negative to reduce anode current essentially to zero corresponds to biasing the transistor emitter sufficiently positive to reduce collector voltage essentially to zero.

III. Biasing the vacuum tube anode negatively so that anode current is reduced to zero corresponds to biasing the transistor collector positively so that the collector voltage is reduced approximately to zero.

*The dual of a simple ladder network*

The foregoing may be illustrated by the design of the dual of the simple ladder network of Fig. 2*a*. The first step in finding the dual is to write down the Kirchhoff equations for the circuit. These are $$\begin{gathered} R_1 i_1 + jL\omega i_2 = E \\ -jL\omega i_2 + (1/jC\omega) i_3 + R_2 i_3 = 0 \end{gathered} \qquad (1)$$

and $$i_1 - i_2 - i_3 = 0$$

Now, in these equations every $i$ is to be replaced by $e/r$ and every $e$ by $ri$. The quantity $r$ is a constant of the transformation which in this case can be given any positive or negative value. The effect of $r$ is to determine how many volts in the dual circuit are equivalent to one ampere in the original. If the circuit includes a vacuum tube then the value of $r$ is fixed by the relation between the vacuum tube quantities and the corresponding quantities of the transistor which is to replace the tube. In this case $$r^2 = r_c r_p \qquad (2)$$

where $r_c$ is the collector resistance of the transistor and $r_p$ is the plate resistance of the vacuum tube.

When equations (1) are transformed as indicated, they become $$\begin{gathered} \frac{e_1}{(r^2/R_1)} + \frac{e_2}{(r^2/jL\omega)} = I \\ -\frac{e_2}{(r^2/jL\omega)} + \frac{e_3}{(jr^2/C\omega)} + \frac{e_3}{(r^2/R_2)} = 0 \\ e_1 - e_2 - e_3 = 0 \end{gathered} \qquad (3)$$

These are the equations which apply to the dual circuit. A circuit which will fit them must now be found. To do so, it may be noted that the term $e_1/(r^2R_1)$ denotes the current through a resistance of value $R_1' = r^2/R_1$, provided $e_1$ is interpreted as the voltage drop across this resistance. The dual circuit must then contain this resistance $R_1'$ with a voltage drop $e_1$ across it. Carrying this reasoning through for the other terms in the first two of equations (3) leads to the conclusion that the dual circuit contains the following elements:

$$\begin{gathered} R_1' = r^2/R_1 \\ R_2' = r^2/R_2 \\ C' = L/r^2 \\ L' = r^2 C \end{gathered} \qquad (4)$$

From the foregoing it may be seen that in passing from any circuit to its dual, every voltage is replaced by a current, every current by a voltage, every resistance by a conductance and vice versa, every inductance by a capacitance and vice versa. Equations (3) can now be written in a simpler notation as follows:

$$\begin{gathered} i_{R_1'} + i_{C'} = I \\ -i_{C'} + i_{L'} + i_{R_2'} = 0 \\ e_1 - e_2 - e_3 = 0 \end{gathered} \qquad (5)$$

where $i_{C'}$ means the current through a capacitance of value C' etc.

All the elements in the dual circuit are now known and the Kirchhoff equations, (5), tell how these elements must be connected together; i. e., they are to be interconnected as shown in Fig. 2*b*.

The notation employed in Equations (5) is a very useful one, and now that more is known about how the transformation will turn out, a substantial saving of effort can be effected by applying this same notation to the original equations (1).

Let $e_L$ stand for the voltage across L (measured in such a direction that $i_L$ flows from + to −) and let a similar notation be employed for every $e$. Equations (1) and their duals (5) thus become $$\begin{array}{ll} e_{R_1} + e_L = E & i_{R_1'} + i_C' = I \\ -e_L + e_C + e_{R_2} = 0 & -i_{C'} + i_{L'} + i_{R_2'} = 0 \\ i_{R_1} - i_L - i_C = 0 & e_{R_1'} - e_{C'} - e_{L'} = 0 \\ i_C = i_{R_2} & e_{L'} = e_{R_2} \end{array} \qquad (6)$$

It may be noted that a fourth equation has been added to express the fact that the current through C is the same as that through $R_2$. The need for this can be avoided if the notation is extended somewhat to include terms such as $$i_{R_2C}$$

which denotes the current which flows through $R_2$ and C and implies that the current through $R_2$ is the same as that through C. The corresponding term in the dual equation then becomes $$e_{R'_2L'}$$

which denotes the voltage across $R_2'$ and L' and implies that the two voltages are the same.

It can be seen by inspection of equations (6) that the dual transformation amounts to making the following substitutions:

$$\begin{array}{ll} E \to I & i_L \to e_{C'} \\ e_{R_1} \to i_{R_1'},\ e_{R_2} \to i_{R_2'} & e_C \to i_{L'} \\ i_{R_1} \to e_{R_1'},\ i_{R_2} \to e_{R_2'} & i_C \to i_{L'} \\ e_L \to i_{C'} & \end{array} \qquad (7)$$

It can also be seen from Figs. 2a and 2b that circuit elements in series are transformed into elements in parallel and vice versa, while mesh equations become node equations and vice versa. This holds in general and is of assistance in finding circuits to fit the dual equations.

Furthermore the input (left-hand) terminals of Fig. 2b may be said to correspond, dualitywise, with the input (left-hand) terminals of Fig. 2a, while the output (right-hand) terminals of Fig. 2b correspond, dualitywise, with the output (right-hand) terminals of Fig. 2a; and the same holds for any dual pair of networks each of which has input terminals and output terminals.

*The dual of a single R-C coupled amplifier stage*

The procedure for finding the transistor dual of a circuit which contains a vacuum tube triode is the same as that described for a passive network except that the following additional substitutions must be made:

$$e_p \rightarrow -i_c$$
$$i_p \rightarrow -e_c$$
$$e_g \rightarrow -i_e$$

and (8)

$$i_g \rightarrow -e_e$$

Figure 3A:
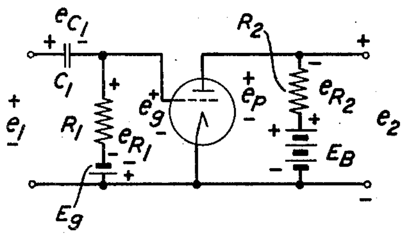
Figure 3B:
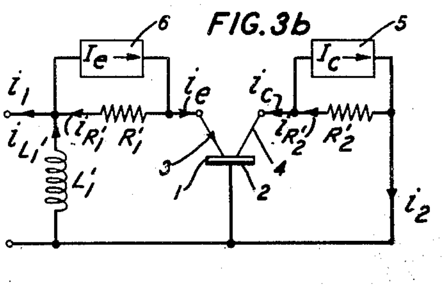

Fig. 3a shows a vacuum tube amplifier circuit of conventional design and four of the equations which describe it. Fig. 3b shows the transformed equations and a transistor circuit which satisfies them. Here, as in other figures to follow, the semiconductive body of the transistor is represented by a thin rectangle 1, its base electrode by a heavy line 2, its emitter electrode by a thin wire 3 bearing an arrowhead pointed toward the body, and lying at an angle with the body surface, and its collector electrode by another thin wire 4 at an equal and opposite angle but without an arrowhead. As in the case of Figs. 2a and 2b, the constant voltage source $E_B$ which supplies operating bias voltage to the vacuum tube anode circuit has been transformed into a constant current source $I_C$ which supplies bias current to the transistor collector, and the conventional symbol for a constant voltage source such as a battery is replaced, in Fig. 3b and in other figures to follow, by a conventionalized box 5, 6 containing a capital letter I, designating a constant current, together with a distiguishing subscript and an arrow to indicate its direction of flow. Similarly the grid bias constant voltage source $E_c$ has been transformed into an emitter bias constant current source $I_e$. These constant bias currents are not to be confused with the actual collector and emitter currents. The actual emitter current is in fact equal to the sum of the emitter bias current $I_e$ and the current $$i_{R_1'}$$

which flows through the resistor $R_1'$ connected in parallel with the current source, while the actual collector current is in fact equal to the sum of the collector bias current $I_C$ and the current $$i_{R'_2}$$

which flows through the resistor $R_2'$, connected in parallel with the current source. These relations are stated mathematically in the second and third equations under the figure.

Now it is well known in electric circuit analysis that the parallel combination of a source of current I with a resistor R is, from the standpoint of external measurements, equivalent to the series combination of a source of voltage E with the same resistor R, provided the magnitude of the voltage source is chosen to satisfy the relation $$E=IR \quad (9)$$

which is known as Thevenin's theorem. This equivalence is depicted in Fig. 3c.

Figure 3C:
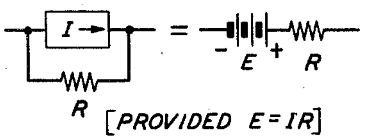
Figure 4:
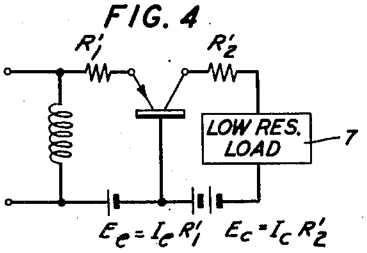
Fig. 4 is a schematic circuit diagram of a transistor amplifier embodying the principles of Fig. 3*b* and with a low resistance load.

Because constant voltage sources are more common and less costly than constant current sources, it is usually preferred, as a practical matter, to realize the transistor current supplies by way of the circuit shown to the right in Fig. 3c, than by the one shown to the left. Furthermore this arrangement involves a smaller consumption of direct-current power in the resistor R. Accordingly, the parallel constant current sources of Fig. 3b are replaced in Fig. 4 by series constant voltage sources $E_e$ and $E_c$ whose magnitudes satisfy the relation (9). Just as in the conventional vacuum tube amplifier of Fig. 3a, for high voltage gain at the output terminals the resistor $R_2$ should be of large resistance and the anode voltage supply $E_B$ should be of high potential, so in Fig. 3b, for high current gain the resistor $R_2'$ should be of low resistance, and the injected current $I_C$ should be large. In Fig. 4 these results are obtained by the use of a low resistance load 7 in series with a battery $E_C$ which satisfies the relation (9) and a resistor for controlling the magnitude of the bias current which resistor, however, is usually of negligible value.

Figure 5:
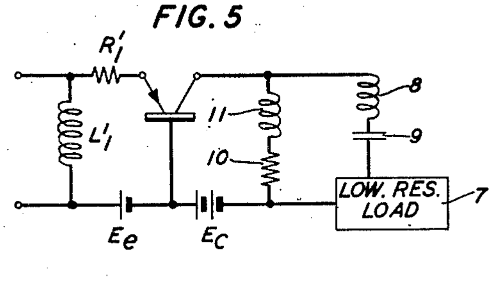
Fig. 5 is a schematic circuit diagram of a transistor amplifier embodying the principles of Fig. 3*b* and with a tuned circuit coupling to a load.

Similarly, it is common in the vacuum tube amplifier art to replace the resistor $R_2$ of Fig. 3a by a parallel tuned circuit. Duality calls for a corresponding replacement of the resistor $R_2'$ in the output circuit of Fig. 4 by a low impedance reactive circuit, and this is physically realizable by way of a series-tuned circuit comprising a coil 8 and a condenser 9 as shown in Fig. 5. Because the condenser operates not only as a tuning element but as a blocking element as well, the transistor collector bias current supply $I_c$ must be otherwise furnished, and to this end a current source such as battery $E_c$, in series with a high resistor 10 and a choke coil 11, is connected in shunt with the tuned circuit and the load 7. The input circuit is the same as in Fig. 4.

Because of the reactive properties of the tuned circuit, which reduces the effects of nonlinear distortion at the operating frequency, this amplifier may be biased substantially to collector voltage cutoff or beyond, thus greatly reducing the steady or direct current power consumed by the load 7 in the absence of a signal.

As is well known, in a vacuum tube amplifier such as that of Fig. 3a the combination of the resistor $R_1$ connected between the grid and the cathode of the tube and the condenser $C_1$ connected in series between the grid and the source operates automatically to supplement the negative grid bias once it has been overcome by the occurrence of an excessive positive signal peak. This action takes place by reason of the fact that the current drawn by the grid operates to charge the condenser with such a polarity that the stored charge acts to supplement the original steady negative bias. The situation dual to this is secured by the operation of the combination of the inductive element $L_1'$ and the resistor $R_1'$ in the input circuit of the transistor amplifiers of Figs. 3b, 4 and 5. Upon the occurrence of an excessive negative signal peak tending to drive the emitter of the transistor below its (current) cutoff, the source current is then all drawn through the inductance element $L_1'$; and the current thus stored in this element operates, upon the next half cycle, to augment the steady bias supplied by the bias current $I_e$. The magnitude of the resistor $R_1'$ is proportioned, in relation to the emitter contact resistance, to discharge the coil $L_1'$ at a desired rate upon the termination of the transient condition.

For efficient action in this manner the impedance of the signal source which drives the transistor amplifier should be high, thus being the dual counterpart of the source which drives the tube, whose impedance should be low.

*The dual of a class B push-pull amplifier*

Figure 6:
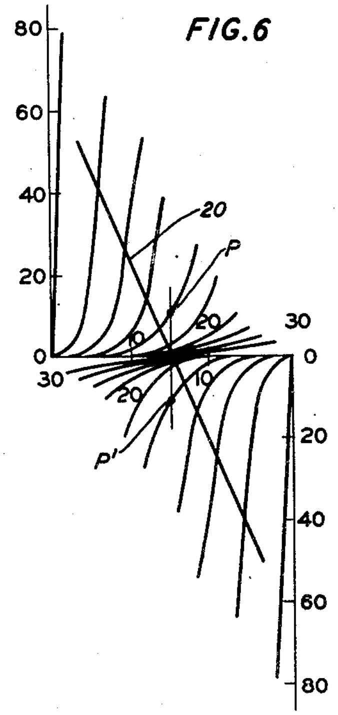
Fig. 6 shows two families of transistor characteristics each of which is the same as that of Fig. 1*b*, and juxtaposed back to back for illustration of class B push-pull operation.

Fig. 7*a* shows a conventional class B vacuum tube push-pull amplifier with its defining equations while Fig. 7*b* shows its transistor dual circuit together with the corresponding equations. Duality appears in the choice of the character and magnitudes of the electrode biases. In order to obtain the high efficiency corresponding to class B operation, the emitters of the two transistors are biased toward high emitter current and the collectors toward high collector current, so that collector voltage is cut off during approximately one-half of each cycle. These bias conditions are illustrated in Fig. 6 where the family of characteristic curves for the one transistor are plotted back to back with those for the other transistor. In operation when a signal to be amplified is applied, for example by way of an input transformer 15 to the two emitters in push pull, the amplified version being correspondingly withdrawn by way of an output transformer 16, current and voltage swing approximately along a load line 20 (Fig. 6), while in the absence of a signal the collector voltages are both small compared to their values at the peaks of their swings. To avoid the distortion which would result from utilization of the highly non-linear parts of the characteristics which lie immediately adjacent to the current axis, the bias currents may be selected to locate the quiescent conditions of the two transistors approximately at the points P and P' in Fig. 6.

The power supply arrangement shown in Fig. 7*b* satisfies the dual equations but is more elaborate than is necessary. As in the case of Figs. 3*b* and 4 the required operating currents can be derived from batteries and supplied by way of appropriate impedance elements in series with the input circuit and with the load. Fig. 8 shows such an arrangement, more practical than Fig. 7*b*, in which a first battery 21, choke coil 22 and resistor 23 are connected from the bases of the two transistors to a center tap of the secondary winding of an input transformer 24 to supply the emitter currents, while the collector currents are similarly supplied from a second battery 25 which is connected in series with a choke coil 26 and a resistor 27 from the bases of the transistors to a center tap on the primary winding of an output transformer 28.

Fig. 9 shows a modification of Fig. 8 in which, by appropriate proportioning of the resistors 23, 27, and choke coils 22, 26, the emitter bias current $I_e$ and the collector bias current $I_c$ may both be supplied from a common source such as a battery 29.

The push-pull transistor amplifier of Figs. 8 and 9 may be modified to supply power to load through a tuned circuit. Fig. 10 shows such a tuned amplifier wherein, in accordance with the duality principle, the familiar antiresonant circuit of the tuned vacuum tube amplifier is replaced by a series resonant circuit in the output of the transistor amplifier. This resonant circuit comprises an inductance element 31 and two series condensers 32, 32'. Two condensers are recommended for reasons of balancing though, as far as tuning is concerned, a single condenser would serve as well. The operating collector currents may be supplied from a battery 29 by way of high resistors 23, 27, 27' and chokes 22, 26, 26'. This supply arrangement combines the features of Fig. 5 with those of Fig. 9.

Because of the reactive properties of the tuned circuit load, which reduces the effects of non-linear distortion at the operating frequency, this amplifier may be biased substantially to or beyond collector voltage cut off; i. e., it may be operated in a fashion which is dual to the operation of a class B or a class C push-pull vacuum tube amplifier.

When more gain is required than can be obtained with a single stage transistor amplifier, two or more stages may be connected in cascade. The duality principle calls for feeding the collector current output of an earlier stage to the emitter of the following stage, as compared with the voltage cascading which is familiar in the vacuum tube amplifier art. When, in addition, it is desired that each stage shall be tuned, the duality principle calls for series-tuned resonant tuned circuits instead of the parallel-tuned or antiresonant circuits which are familiar in connection with tuned vacuum tube amplifiers. Fig. 11 shows a three-stage tuned push-pull amplifier which embodies both of these requirements. As in the case of Fig. 10, each stage of the amplifier of Fig. 11 may be biased to operate on a class B basis and even on a class C basis. Here bias currents for the emitters and collectors may all be supplied by way of choke coils and resistors from a common source 40 in the manner shown in Fig. 9. The interstage coupling between the first stage and the second is secured by way of a series resonant circuit comprising a coil 41 and a condenser 42 connected between the collector of the upper transistor of the first stage and the emitter of the upper transistor of the second stage, while a similar circuit 41', 42' interconnects the corresponding electrodes of the lower transistors of the two stages. At the frequency to which these coupling circuits are tuned, their impedances are low compared with the collector contact impedances to which they are connected; and consequently, large signal frequency currents are delivered by the collectors of the transistors of the first stage to the emitters of the second stage, where they serve as second stage input currents. At other frequencies at which the impedances of the coupling circuits are high compared with the collector contact resistances to which they are connected, the collector currents so transferred from stage to stage are greatly reduced.

As an alternative, both input and output portions of any stage may be tuned, interstage coupling of any convenient variety being employed. As an example, Fig. 11 shows, in the case of the second stage and the third, a series resonant tuned circuit for the output of the one and another series resonant tuned circuit for the input of the other, the respective inductance coils of these tuned circuits being provided by the windings of an interstage transformer 45 whose turns ratio may be adjusted to give a desired impedance transformation.

The series-tuned resonant circuit is but the simplest case of a more general class of frequency selective networks whose impedances are low in the pass band and higher outside of it. It is contemplated that any network or filter of this class may be employed instead of the simple series-tuned circuits shown. A number of such networks are described in "Transmission Networks and Wave Filters," by T. E. Shea (Van Nostrand, 1929), pp. 315 ff.

The same principles may be applied to an amplifier of any number of stages, series resonant circuits or more complex band pass filters being employed either to tune the input or the output of any stage, or to couple any stage to the stage which follows it. Aside from being more suitable for transistors than an antiresonant interstage coupling circuit, the series resonant coupling circuits shown have the further advantage that they automatically prevent unwanted oscillations. Just as the vacuum tube is inclined to be unstable when the impedances to which it is connected are too high, so the transistor is sometimes unstable when the impedances to which it is connected are too low. The impedances of the series resonant coupling circuits and of the more general class of filters to which they belong are higher at all frequencies other than the frequency to which they are tuned than they are at that frequency, and so tend to stabilize the transistors against undesired oscillations.

When the amplifiers of Figs. 8, 9, 10 and 11 are driven by high impedance sources, the choke coil-resistor combination by way of which the emitters of the transistors of these figures are connected to their bases operate in each case to provide automatic bias adjustment in the manner described above in connection with Fig. 3b.

The principles of the invention, which have been described as applied to amplifiers, are evidently equally applicable to circuits of other classes such as modulators, detectors, and the like. Thus, transistor oscillator circuits which embody the foregoing principles are the subject matter of an application of R. L. Wallace, Jr., Serial No. 184,459, filed September 12, 1950, and transistor multivibrator circuits embodying these principles are the subject of R. L. Wallace, Jr., Patent 2,620,448, which issued December 2, 1952, on application Serial No. 184,458, filed September 12, 1950. Still other departures from the details of the illustrative embodiments shown are within the spirit of the invention.

What is claimed is:

1. A signal translating circuit which comprises a transistor having a semiconductive body, an emitter electrode, a collector electrode, and a base electrode engaging said body, an input circuit interconnecting said emitter electrode with said base electrode, an output circuit interconnecting said collector electrode with said base electrode, means for supplying to said emitter electrode a bias current which is substantially fixed in magnitude regardless of normal changes in the emitter electrode voltage and for supplying to said collector electrode a bias current which is substantially fixed in magnitude regardless of normal changes in collector electrode voltage, said means being proportioned to supply said fixed emitter bias current in magnitude such that, in the absence of a signal applied to said input circuit, the collector voltage of said transistor is substantially equal to zero, whereby application of an alternating input signal to said emitter electrode causes said collector voltage to swing away from its zero value and back again during signal excursions of one sign and to remain at said zero value throughout signal excursions of the opposite sign.

2. In combination with apparatus as defined in claim 1, a frequency-selective network connected in series with said output circuit, said network having a relatively low impedance at a frequency to be translated and a relatively high impedance at higher and lower frequencies.

3. Apparatus as defined in claim 2 wherein the network comprises a series-tuned resonant circuit.

4. In combination with a signal source, a signal translating apparatus as defined in claim 1, of which the input circuit is coupled with said source, wherein the fixed emitter bias current supply means comprises a resistor and an inductance coil connected in said input circuit, said resistor being proportioned in relation to the emitter electrode contact resistance to furnish said fixed emitter bias current in the absence of a signal, said inductance coil being proportioned in relation to the impedance of the signal source to automatically increase said emitter bias current above said desired value in the presence of excessive signal peak amplitudes.

5. A multistage translating circuit of which each stage comprises a translating circuit as defined in claim 1, a signal source coupled to the input circuit of the first stage, a load coupled to the output circuit of the last stage, and a series resonant combination of an inductive reactance element and a capacitive reactance element directly connecting the collector of the transistor of one stage to the emitter of the transistor of the following stage.

6. A push-pull signal translating circuit which comprises a pair of transistors each having a semiconductive body, an emitter electrode, a collector electrode, and a base electrode engaging said body, said base electrodes being connected together, an input circuit interconnecting said emitter electrodes, an output circuit interconnecting said collector electrodes, means for supplying to said emitter electrodes bias currents which are substantially fixed in magnitude regardless of normal changes in emitter electrode voltage and for supplying to said collector electrodes bias currents which are substantially fixed in magnitude regardless of normal changes in collector electrode voltage, said means being proportioned to supply said fixed emitter bias currents in magnitudes such that, in the absence of a signal applied to said input circuit, the collector voltages of said transistors are individually substantially equal to zero, whereby application of an alternating input signal to said emitter electrodes causes said collector voltages to swing away from their zero values and back again in alternation, each remaining at its zero value throughout signal excursions of one sign.

7. In combination with apparatus as defined in claim 6, a frequency-selective network connected in series with said collector electrodes, said network having a relatively low impedance at a frequency to be translated and a relatively high impedance at higher and lower frequencies.

8. Apparatus as defined in claim 7, wherein the network comprises a series-tuned resonant circuit.

9. In combination with a signal source, signal translating apparatus as defined in claim 6, of which the input circuit is coupled with said source, wherein the fixed emitter bias current supply means comprises a resistor and an inductance coil connected in said input circuit, said resistor being proportioned in relation to the emitter electrode contact resistances to furnish said fixed emitter bias currents in the absence of a signal, said inductance coil being proportioned in relation to the impedance of the signal source to automatically increase said emitter bias currents above said desired value in the presence of excessive signal peak amplitudes.

10. A multistage push-pull translating circuit of which each stage comprises a translating circuit as defined in claim 6, a signal source coupled to the input circuit of the first stage, a load coupled to the output circuit of the last stage, and a series resonant combination of an inductive reactance element and a capacitive reactance element directly connecting the collector of one transistor of one stage to the emitter of one transistor of the following stage.

ROBERT L. WALLACE, JR.

References Cited in the file of this patent

UNITED STATES PATENTS

| Number | Name | Date |
|---|---|---|
| 2,502,479 | Pearson et al. | Apr. 4, 1950 |
| 2,517,960 | Barney et al. | Aug. 8, 1950 |
| 2,524,035 | Bardeen et al. | Oct. 3, 1950 |
| 2,541,322 | Barney | Feb. 13, 1951 |
| 2,569,347 | Shockley | Sept. 25, 1951 |

OTHER REFERENCES

Terman, "Radio Engineering," 3d ed. pp. 248–249, pub. 1947 by McGraw Hill Book Co., N. Y.

Electronics, Sept. 1948, pp. 68–71. Copy in 179–171–MB.

Radio Amateur's Handbook, publ. American Radio Relay League, Inc., 22nd edition, 1945, p. 72. fig. 319.